United States Patent [19]

Eickelberg et al.

[11] 4,042,869
[45] Aug. 16, 1977

[54] BACKLASH COMPENSATION

[75] Inventors: John E. Eickelberg; James S. Rice, both of Columbus, Ohio

[73] Assignee: Industrial Nucleonics Corporation, Columbus, Ohio

[21] Appl. No.: 128,718

[22] Filed: Mar. 29, 1971

[51] Int. Cl.² .................................. G05B 11/01
[52] U.S. Cl. .................................. 318/630
[58] Field of Search .................................. 318/630

[56] References Cited

U.S. PATENT DOCUMENTS

| | | | |
|---|---|---|---|
| 2,870,386 | 1/1959 | Kelling | 318/630 |
| 2,876,650 | 3/1959 | Sangster | 318/630 X |
| 3,210,632 | 10/1965 | Benton et al. | 318/630 X |
| 3,355,642 | 11/1967 | Leenhouts | 318/630 |
| 3,466,515 | 9/1969 | Madsen et al. | 318/630 X |
| 3,560,830 | 2/1971 | Steinberg | 318/630 |

Primary Examiner—Robert K. Schaefer
Assistant Examiner—John J. Feldhaus
Attorney, Agent, or Firm—W. T. Fryer, III; Allan M. Lowe; C. Henry Peterson

[57] ABSTRACT

A system for compensating for the backlash of a drive mechanism of an actuator that can be controlled manually or switched to automatic, with the starting position indeterminate. The actuator includes a position transducer for the actuator. Impulses are supplied to the drive mechanism to energize the drive mechanism in discrete steps in a first direction. In response to a change in the actuator position being sensed by the position transducer, the supply of impulses to the drive mechanism is terminated. Because of backlash in gearing included in the drive mechanism, each of the impulses to the drive mechanism does not necessarily result in a change in the actuator position. In response to movement of the actuator being sensed the drive mechanism is energized in a direction opposite to the first direction through a distance equal to the sum of the backlash and the amount of movement of the actuator detected by the position transducer.

11 Claims, 2 Drawing Figures

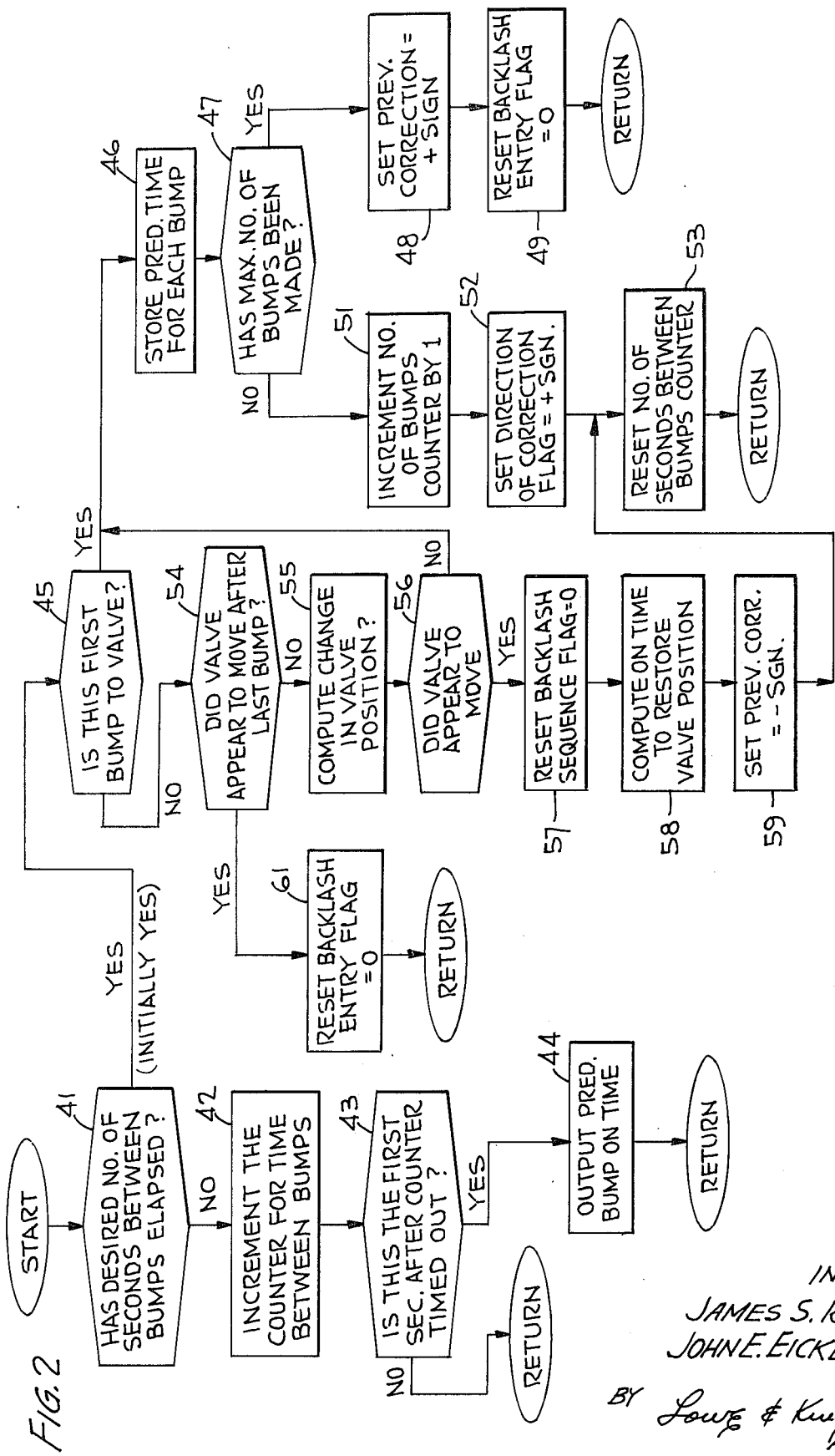

BACKLASH COMPENSATION

FIELD OF INVENTION

The present invention relates generally to controllers for the position of actuators and more particularly to a system for and method of compensating for backlash in drive mechanisms of actuators.

BACKGROUND OF THE INVENTION

Drive mechanisms, such as gearboxes and motors, for actuators, such as valve stems, are frequently characterized by appreciable backlash. In certain instances, the drive of a motor required to take up the backlash can be on the same order of magnitude as a drive command signal derived by an automatic controller. Prior systems developed for compensating the backlash of a drive mechanism have generally been concerned with backlash during normal operation in response to an automatic controller. These systems are generally inappropriate for use in conjunction with drive mechanisms susceptible to automatic, as well as manual, control.

Manual control of a drive mechanism introduces problems because an operator may cause the drive mechanism to be left at an indeterminable position between a pair of backlash limits. It cannot be assumed that a drive mechanism controlled by manual operation is set at one or the other of the backlash limits. Therefore, the amount of drive necessary to compensate for the possible intermediate backlash state is unknown when drive is changed from manual to automatic. Therefore, in many instances the first signal supplied by a controller to a drive mechanism after the controller has been switched from manual to automatic is not of the proper amplitude to activate the actuator to the correct position. The resultant error in the position of the actuator may be continuously propagated with deleterious results, for one or more process control actions. This is particularly true in systems that have only a feed forward loop.

BEIEF DESCRIPTION OF THE INVENTION

In accordance with the present invention compensation for the backlash of the drive mechanism of an actuator, such as the valve stem of a stock valve controlling the rate of fibrous slurry to a paper making machine, is compensated during a starting period while drive for the stem position is switched from manual to automatic by supplying impulses to the drive mechanism to energize the drive mechanism in discrete steps in a first direction. Because of the drive mechanism backlash and the susceptibility of the backlash state being indeterminate at the end of manual operation, it is likely that the initial impulses to the drive mechanism will have no effect on the position of the actuator. To activate the drive mechanism so that all of the backlash in one direction is taken up, the drive mechanism is supplied with pulses until a position transducer for the actuator provides an indication that a change in the actuator position has occurred. The magnitude of the change in position is measured and added to a predetermined signal indicative of the amount of backlash to derive a control signal for the drive mechanism. The drive mechanism is driven in response to the control signal in a second direction opposite to the first direction so that all of the backlash is taken up in direction opposite to the direction in which the drive mechanism was driven in discrete steps. Thereby, the drive mechanism is set at a predetermined point and the first control signal fed thereto while the system is in an automatic operating mode can reflect a backlash compensation if necessary. The first control signal during the automatic mode has a magnitude to compensate for backlash if it activates the drive mechanismm in the first direction, i.e., in a direction opposite to movement of the actuator immediately preceeding derivation of the first control signal. If the first control signal supplied to the drive mechanism during the automatic operating mode is in the same direction as the second direction, it does not include a measure of distance necessary for backlash compensation.

It is, accordingly, an object of the present invention to provide a new and improved system for and method of compensating for backlash of a drive mechanism.

Another object of the invention is to provide a system for and method of compensating for the backlash of a drive mechanism susceptible to activation in response to manual and automatic control wherein inaccuracies are not introduced in a transition from a manual to an automatic operating condition.

An additional object of the present invention is to provide a system for compensating for the backlash of a drive mechanism of an actuator susceptible to manual and automatic control, wherein compensation is performed by monitoring the position of the actuator in response to impulses supplied to its drive mechanism and means are provided for reversing the direction of the drive mechanism in response to movement of the actuator being detected.

The above and still further objects, features and advantages of the present invention will become apparent upon consideration of the following detailed description of one specific embodiment thereof, especically when taken in conjunction with the accompanying drawings.

BRIEF DESCRIPTION OF THE DRAWING

FIG. 2 is a flow diagram of the operations performed by the digital computer illustrated in FIG. 1.

DETAILED DESCRIPTION OF THE DRAWING

Figure 1:
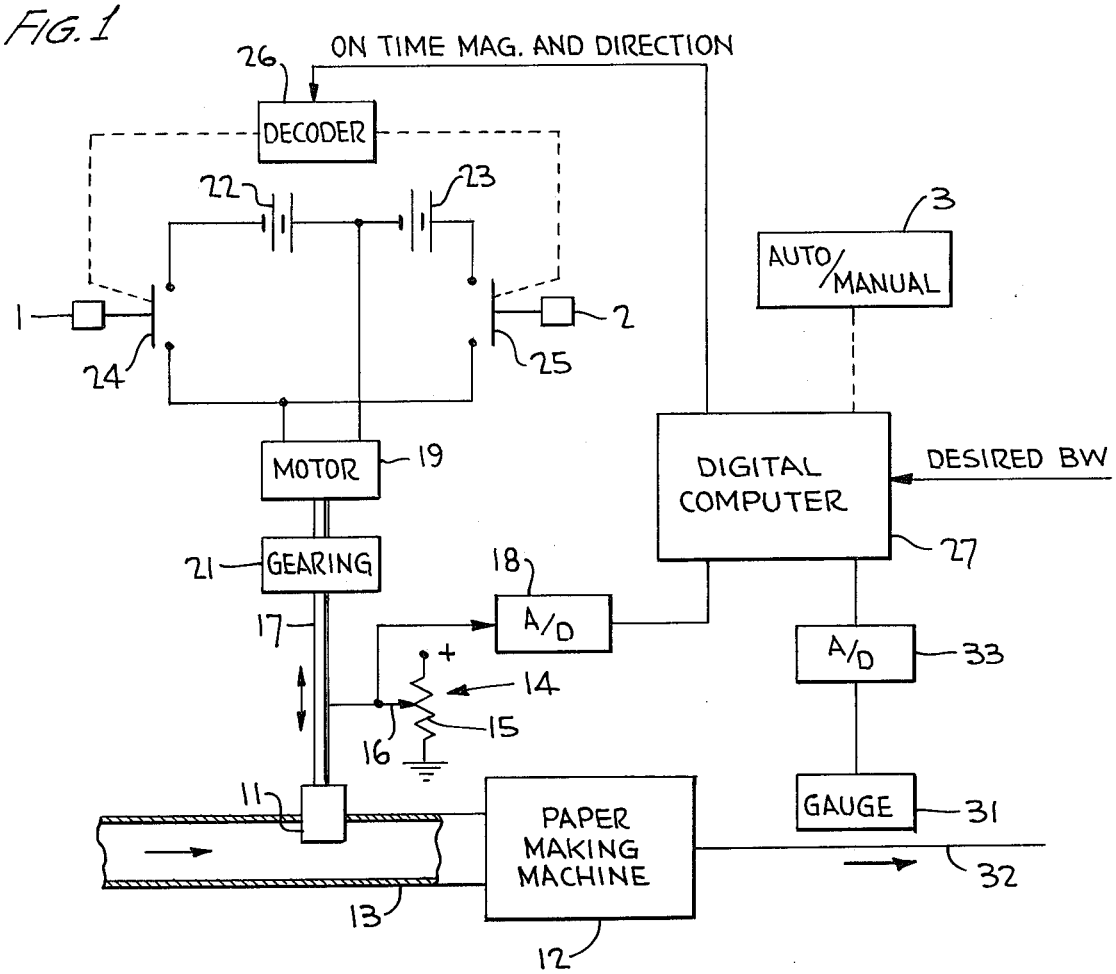
FIG. 1 is a block diagram of one embodiment of the present invention.

Reference is now made specifically to FIG. 1 wherein the invention is illustrated in conjunction with valve 11 which controls the amounts of fibrous slurry fed to paper making machine 12 through conduit or pipe 13. Fixedly mounted on valve 11 is its actuator, valve stem 17 that is moved between stops by a drive mechanism including motor 19. Motor 19 opens and closes valve 11 by variable, controlled amounts to determine the amount of fibrous slurry fed by conduit 13 to paper making machine 12. It is recognized that this invention can be applied to the control of other valves on a paper machine, as well as on other processes.

Typically, gearing 21 has considerable backlash so that reversals in the drive direction of motor 19 are not always accurately reflected in the position of stem 17 and valve 11. If motor 19, during a first time interval was driving gearing 21, stem 17 and valve 11 in a direction tending to close the valve, the gearing has a tendency to come to rest at a first position after motor 19 has been stopped. If motor 19 is then energized during a second predetermined time interval to be driven in the opposite direction, the backlash of gearing 21 is such that motion is not immmediately imparted to stem 17 and valve 11 has a tendency to remain in situ. Only after motor 19 has been driven through a predetermined distance is the backlash of gearing 21 taken up and stem 17 commences to translate to open valve 11. Activation time of constant speed motor 19 can thereby be correlated with the backlash of gearing 21. If the activation time of motor 19 is on the same order of magnitude as the time required to take up the backlash of gearing 21, changes in the position of valve 11 will not correspond with the activation time, i.e., on-time, of motor 19. The purpose of the system illustrated in FIG. 1 is to provide compensation for the backlash of gearing 21 between motor 19 and valve stem 17.

The backlash compensation for gearing 21 is particularly important in the present invention since motor 19 can be driven either manually in response to activation of push buttons 1 and 2 or in response to control signals derived automatically. In manual operation, an operator depresses button 1 or button 2 for variable time intervals to open or close valve 11. Through experience, the operator is generally able to ascertain the length of time the buttons should be depressed for a desired change in flow of the fibrous slurry through valve 11. It has been found, however, that the operator is not usually able to compensate for backlash of gearing 21 and may, in many instances, activate motor 19 in such a manner that gearing 21 is at a midpoint in its backlash.

In response to the operator commanding the system to go into an automatic mode by depressing manual-/automatic push button 3, the variable amount of backlash that might need to be compensated in gearing 21 is unknown to an automatic controller. Backlash compensation is performed prior to automatic control signals being supplied to motor 19 in response to measurements derived after the system being activated to the automatic operating mode. Broadly, the procedure for compensating for the backlash of gearing 21 when the system is switched from a manual to an automatic mode involves driving motor 19 for a number of very short time intervals in a direction having a tendency to open valve 11. Motor 19 is driven until the backlash of gearing 21 has been taken up, as determined by position transducer 14. In response to a change in the position of stem 17 being detected by transducer 14, motor 19 is driven through a predetermined distance plus the distance of movement of stem 17 in the opposite direction from the direction of previous drive, i.e., in a direction tending to close valve 11. Thereby, all of the backlash of gearing 21 is taken up and the teeth of the gears are set to drive stem 17 downwardly immediately in response to a close valve command signal being the first signal supplied to motor 19 during the automatic operating mode. In response to the first command signal supplied to motor 19 during the automatic mode being in a direction to cause valve 11 to open, the motor is driven by an amount equal to the predetermined, known backlash of gearing 21 plus an amount equal to the command signal.

The position of valve 11 is determined by position transducer 14 which comprises resistance 15 over which slider 16 is driven by virtue of its fixed connection to stem 17 of valve 11. The position of slider 16 on resistance 15 is indicated by the voltage at the slider that is fed to analog-to-digital converter 18.

Stem 17 is driven through gearing 21 in either an upward or downward direction in response to counterclockwise or clockwise rotation of constant speed motor 19. Motor 19, which for purposes of simplicity is illustrated as being of the d.c. type and response to opposite polarity d.c. sources 22 and 23, may be periodically connected to one of the d.c. sources for variable time periods in response to selective closure of switches 24 and 25. Switches 24 and 25 are selectively closed for variable time intervals to drive stem 17 by differing extents in response to closure of manually operated switches 1 and 2 or to a digital signal derived by general purpose digital computer 27, which signal indicates the desired direction and extent of movement of stem 17. The digital signal supplied to decoder 26 by computer 27 includes a polarity indicating bit and a number of magnitude indicating bits; the latter being translated into different on-time durations for switches 24 and 25. Decoder 26 responds to the polarity and on-time bits supplied thereto by computer 27 to generate control signals for switches 24 and 25. Each control signal generated by decoder 26 closes one of switches 24 or 25 for a length of time indicated by the magnitude bits supplied to the decoder by computer 27. Decoder 26 may take any conventional configuration, of a type such as disclosed in U.S. Pat. Nos. 3,155,962, 3,254,337 or 3,317,905.

Digital computer 27, being of the general purpose type, includes the usual elements of input and output buses and buffers, a memory and an arithmetic unit wherein various calculations and comparison operations are performed. In addition, computer 27 includes output elements such as alarm indicators, in the form of visual and aural alarms, and a device for printing indications derived from the computer, such as an automatic typewriter. Computer 27 is scanned through a set of sequenced operations or a program either periodically or in response to the occurrence of some event in the paper making machine or apparatus associated therewith. Any appropriate general purpose digital computer may be utilized; in one particular embodiment of the invention, the Honeywell 316 computer has been employed.

Digital computer 27 performs two important functions relating to controlling the position of valve 11, as far as the presently described embodiment is concerned, viz: the derivation of signals for (1) backlash compensation, and (2) setting valve 11 while the system is in the automatic mode. For backlash compensation, the computer derives the on-time magnitude and direction signal to drive motor 19 and has a basic program cycle of one time per second. To enable computer 27 to derive signals for the automatic control of the position of valve 11 while in an automatic operating mode, and after backlash of gearing 21 has been taken up, there is provided a gauge 31 that monitors the fiber weight per unit area of paper web 32 produced by paper making machine 12. The output signal of gauge 31 is generally in analog form and is converted into a digital signal by analog-to-digital converter 33. The computer responds to the output signal of converter 33 and compares it with a desired fiber weight per unit area signal supplied to the computer by an operator to derive, once during each approximately two-minute program sequence, the bidirectional signal fed to decoder 26. It is to be understood that more complex means can be employed for deriving the signal supplied by computer 27 to decoder 26.

Typically, gauge 31 is of the scanning type, driven by well-known means (not shown) from one edge to the other edge of sheet 32. Computer 27 responds to signals derived from transducers (not shown) at both edges of sheet 32 to establish the approximately two-minute program operating cycle time. A typical system for controlling computer 27 in response to such transducers is disclosed in the copending application of James S. Rice, Ser. No. 8,377, filed Feb. 3, 1970 for "Control System And Method For Machine Or Process Having Deadband." While the system is in a manual operating mode, detected by computer 27 as a result of the connection between push button 3 and an input to the computer, the computer is unresponsive to the output of analog-to-digital converter 33 and no signals are effectively supplied to decoder 26.

In response to the operator pressing manual/automatic push button 3 while gauge 31 is scanning between the edges of sheet 32 a flag is set at an input to computer 27, which flag signals that the computer should initiate automatic control of the position of valve 11 in response to signals derived from gauge 31. Prior to the computer initiating the automatic control, it is necessary to compensate for the backlash of gearing 21. To enable the computer to have sufficient time to take up and compensate the backlash of gearing 21 prior to initiating automatic control of the position of valve 11 and to prevent interaction between the backlash compensation operations and automatic control of the position of valve 11, backlash compensation may be performed for an entire scan of gauge 31 and is initiated when the scan during which button 3 was depressed has been completed.

Upon completion of the scan during which button 3 was depressed and during the next scan of gauge 31 between the edges of sheet 32 (a period of approximately 2 minutes) computer 27 is programmed to drive motor 19 in a number of relatively small discrete steps in a direction tending to open valve 11 until motion of valve stem 17 is detected by position transducer 14. Motor 19 is driven in a direction having a tendency to open valve 11 because it is generally considered safer to add fiber to the sheet than to reduce the amount of fiber in the sheet. After each of the steps of motor 19 the output of analog-to-digital converter 18 is read into computer 27 and the computer determines if the step resulted in movement of valve actuator stem 17. In response to motion of stem 17 being detected by transducer 14 and reflected in the output of converter 18, computer 27 supplies signals to decoder 26 to drive motor 19 in a direction tending to close valve 11 through an amount equal to the known backlash of gearing 21 and the sensed translation of stem 17. The backlash of gearing 21 is then taken up and the gearing is set at a predetermined point. These operations usually can be performed during the approximately two-minute scan of gauge 31 between the edges of sheet 32. In response to gauge 32 again returning to the edge of sheet 31, computer 27 begins to respond to output signals of gauge 31 to compute on-time magnitude and direction control signals for motor 19 to thereby automatically control the position of valve 11. A typical system for automatically computing the position of valve stem 11 in response to the output of gauge 31 is disclosed in the aforementioned Rice application or in Rice, U.S. Pat. No. 3,676,295, filed Sept. 12, 1969. The magnitude of the control signals includes compensation for the backlash of gearing 21 in a known manner if the direction of stem 17 is to be changed.

Consideration is now given to the program executed by digital computer 27 to drive motor 19 in such a manner as to compensate for the backlash of gearing 21 when manual/automatic button 3 is depressed to signal that valve 11 is automatically to be controlled. In response to the operator activating button 3 a flag is set in computer 27. The computer responds to the following edge of sheet signal derived in response to gauge 31 engaging a position sensor at the edge of sheet so that the main program within computer 27 executes a backlash compensation subroutine once a second until the backlash entry flag is reset in response to a signal generated by the computer and controlled by the program.

It is to be understood that each of the operations indicated by the flow chart is performed in a register in the computer arithmetic unit and the result stored in a memory location from which it is subsequently retrieved. The arithmetic unit can be activated to cumulatively combine signals from memory, compare signals from memory, set signals from memory to different values, and made to function as a counter for incrementing signals from memory, as well as other well known functions.

In the backlash compensation subroutine, the computer is programmed so that it effectively includes a counter for indicating the number of seconds between adjacent energizations of motor 19, which energizations are referred to as bumps in the program and the ensuing description. This counter is generally incremented once during each one-second program cycle time between bumps of motor 19 and is reset to an initial condition in response to each command bump fed by the computer to decoder 26. Because of the finite time required to bump motor 19 and determine with transducer 14 whether the bump resulted in movement of valve 11 and stem 17, bumping is performed at a slower rate than the computer cycle time, which rate can be on the order of once every 15 seconds. The magnitude of each bump is generally a compromise between the minimum disturbance in the sheet basis weight that can be tolerated in response to movement of valve 11, i.e., the minimum tolerable process disturbance, and the length of time required to overcome the backlash of gearing 21.

Entry in the backlash compensation subroutine occurs when button 3 is pushed, setting a flag (backlash entry flag) to a predetermined non-zero value, and a test is made by the calling program, i.e., the calling program reaches a point in its cycle where the backlash entry flag is examined to determine if it has a predetermined non-zero value. Sensing the pre-determined non-zero value enters the backlash compensation subroutine.

The first operation 41 after entry into the backlash compensation subroutine involves reading the state of the counter that indicates the number of seconds between bumps. This counter is initially set, prior to entry into the backlash subroutine and after button 3 is depressed, to a state equal to the desired number of seconds between bumps. Thereby, during the first cycle time when the backlash compensation program is being executed after activation of button 3 the result of operation 41 provides a "yes" answer. Operation 41 is performed by retrieving from memory a predetermined number equal to the desired number of seconds between bumps and the state of a counter utilized to store the number of bumps performed during the backlash compensation. In reponse to the predetermined number and the state of the counter being the same, a yes output is derived during operation 41 and a certain sequence of additional operations is performed, as described infra. In response to there being a difference between the predetermined number and the state of the counter indicating the number of seconds between bumps being different, operation 41 produces a "no" response and the program is stepped to operation 42.

During operation 42, the counter for the time between bumps is incremented by a count of one, enabling the count stored therein to indicate accurately the number of seconds between bumps. Upon completion of operation 42, the program is advanced to operation 43, during which the state of the counter for the time between bumps is compared with a predetermined number to determine if the operating cycle under consideration is the first one-second operating cycle after a yes response was derived during operation 41. In response to the results of the comparison of operation 43 indicating that the operating cycle is not the first cycle after a yes response was derived during operation 41, as indicated by the "no" output of operation 43, the backlash compensation subroutine is exited and the main or call program of computer 27 is reentered. During each of the following one-second cycle times, the backlash compensation program is again entered, until the flag commanding entry into the backlash compensation subroutine is removed.

In response to operation 43 indicating that the presently considered program cycle time is the first cycle time after a yes response was derived during operation 41, operation 44 is performed. During operation 44, a signal is read from a predetermined memory location and fed through the computer output bus to decoder 26. Generally the amplitude and polarity of the signal supplied to decoder 26 during operation 44 are such that motor 19 is driven in a direction tending to open valve 11 and the motor is driven by a predetermined amount commensurate with the bumping time, as described supra. After the backlash of gearing 21 has been taken up the amplitude and polarity of the signal supplied to decoder 26 during operation 44 are equal to an amount necessary to take up all of the backlash and in a direction tending to close valve 11. Upon completion of operation 44 the backlash subroutine is exited and the main or call program of computer 27 is reentered.

Consideration is now given to operations performed, generally once every 10 one-second cycle times, in response to a yes decision being made during operation 41 to indicate that the desired number of seconds between bumps has elapsed. In response to a yes output being derived during operation 41 a set of operations is performed to determine if a bump should be applied during the next succeeding cycle time when operation 44 is reached.

To this end, the initial determination after a yes response has been derived during operation 41 is to determine if the next bump supplied to motor 19 would be the first bump applied thereto, indicated by operation 45. Operation 45 is performed with a counter for the number of bumps applied to motor 19 as a result of backlash compensation. The number of bumps counter is incremented by a count of one each time motor 19 is bumped. The count in the number of bumps counter is compared during operation 45 with a predetermined number in memory indicative of the first bump to the valve. In response to a result of the comparison indicating that the next bump will be the first bump applied to motor 19, indicated by a yes output of operation 45, operation 46 is reached. During operation 46 the predetermined time and polarity indicating signal for each bump is retrieved from memory and stored in a memory location that is read out during the next one-second cycle time during operation 44.

After operation 46 has been performed, the computer program is stepped to operation 47, during which a determination is made as to whether the maximum permissible number of bumps has been made. The maximum permissible number of bumps can be determined on a predetermined basis or by calculating the time of each scan divided by the predetermined interval between adjacent bumps. The calculation is typically performed by monitoring the average time required for gauge 31 to scan between the edges of sheet 32. It is made during the interval between activation of button 3 and gauge 31 reaching the edge of sheet for the first time after activation of button 3, prior to commencement of the backlash compensation subroutine. The maximum permissible number of bumps is such that no bumping can occur after computer 27 is activated to the automatic mode, which occurs as gauge 31 commences its scan back across sheet 32 after the first complete scan of the gauge subsequent to activation of button 3.

The maximum permissible number of bumps comparison is performed because it has been found that problems can possibly result in the control system if there is an interaction between the backlash compensation bumps associated with transitions from manual to automatic operation and automatic correction. Thereby, in response to the maximum number of bumps being detected during operation 47, further bumping of motor 19 is prevented and the system thereafter responds automatically only to control signals derived by computer 27 in response to the output signal of gauge 31.

To these ends, operations 48 and 49 are performed in seriatim in response to a yes response being derived during operation 47. During operation 48 the polarity of the last correction applied to motor 19 is set to a value commensurate with valve 11 being opened because motor 19 was being driven with a tendency to drive valve 11 to an open condition during the backlash compensation subroutine. The previous correction polarity signal set during operation 48 is utilized by the computer program to control the magnitude of the first signal supplied to decoder 26 during automatic operation after backlash compensation has been completed.

After operation 48 has been completed, the backlash entry flag is reset to zero during operation 49. Thereby, during the next one-second computer cycle time the backlash compensation program will not be entered and backlash compensation is prevented after the maximum number of bumps have been made. Following operation 49, the subroutine is exited and the main or calling program of computer 27 is reentered.

In response to a no decision having been made during operation 47 the program is sequenced through operations 51, 52 and 53 prior to returning to the main or calling program. During operation 51 the counter storing the number of bumps is incremented by a count of one. Upon completion of operation 51, the direction of the correction flag is set again to a positive sign to indicate that the bump is to be in a direction having a tendency to open valve 11. This indication is read out to decoder 26 through operation 44 during the next one second computer cycle time.

During operation 53 the counter used to store an indication of the number of seconds between adjacent bumps is reset to its initial condition, for example, to a count of one. As a result of the number of seconds between bumps counter being reset to a count of one during operation 53 entry of the backlash compensation program during the next one-second cycle time results in a no output of operation 41. In response to the no output of operation 41, the time between bumps counter is incremented to a count of two during operation 41. Following operation 42, during operation 43, it is ascertained that the cycle time being considered is one cycle after the cycle time when a yes result was derived by operation 41 so that the on-time stored during operation 46 is readout, as indicated by operation 44.

During the next cycle time, operations 41, 42 and 43 are performed in sequence, with the result of operation 43 providing a no output, whereby the backlash compensation program is exited with only a change being made in the counter for the time between adjacent bumps. Operation continues in this manner until the number of seconds between bumps counter reaches a predetermined number, equal to the desired number of seconds between bumps, the result indicated by the yes output of operation 41.

With a yes output derived during operation 41, operation 45 is performed as indicated supra. Following the sequence of operations described heretofore, a no output is derived during operation 45 so that the computer advances to operation 54. Operation 54 involves inspecting a backlash sequence flag initially set to a no value in response to activation of push button 3 prior to the first entry into the backlash subroutine. The flag of operation 54 is maintained in a no state until it is set to a yes state in response to movement of stem 17 being sensed, as described infra.

In response to a no flag being sampled during operation 54, the computer program advances to operation 55, during which the change in the valve position as a result of the last bump to motor 19 is calculated. The calculation is performed by providing in the memory of computer 27 storage locations for the position indicating output signal of analog-to-digital converter 18 prior to and after the preceding bump. Sampling of the output of analog-to-digital converter 18 is performed by computer 27 each time a yes output is derived during operation 41, by a program operation that is not illustrated. The signals indicative of the position of stem 17 before and after the preceding bump are fed from memory to the computer arithmetic unit, where one is subtracted from the other. The result remains in a register of the arithmetic unit and during operation 56, which follows after operation 55, is compared with a predetermined, minimum measurement resolution value for position transducer 14 and converter 18, a value retrieved from memory to determine if valve 11 appeared to move in response to the preceding bump applied to motor 19. The computed change in valve position determined during operation 55 is then returned to an appropriate memory location for possible subsequent use.

In response to a no output being derived during operation 56 to indicate that valve 11 did not appear to move in response to the bump previously applied to motor 19, the program is advanced to operation 46. In response to operation 46 being reached via operation 56, the computer program proceeds as described supra with regard to operation 47 in combination with operations 48 and 49 or operations 51-53. The program sequence is from operation 56 to operation 46 for the program cycles when a yes response is derived during operation 41 until a yes indication is derived during operation 56 to indicate that valve 11 did actually appear to move in response to the last bump applied thereto. In response to operation 56 providing an indication that valve 11 appeared to move, operation 57 is performed to change the value of the backlash sequence flag associated with operation 54 from a no to a yes value.

A yes output of operation 56 indicates that the backlash of gearing 21 has been taken up and that there has been movement of valve 11. To enable gearing 21 to be positioned at the other end of its backlash, where an automatic mode command signal having a polarity causing motor 19 to drive valve 11 toward a closed condition will result in immediate movement of valve 11, it is necessary to compute the amount of time required to drive motor 19 through the backlash of gearing 21 plus the amount of excess movement of valve 11 sensed during operation 55. The computation is performed during operation 58. During operation 58 the change in valve position, as determined during operation 55, is multiplied by a predetermined constant indicative of the velocity of valve stem 17 as it is being translated toward a closed position by motor 19 and gearing 21 to derive a computed produce signal equal to the on-time of motor 19 necessary to take up the movement determined during operation 55. After the multiplication computation has been performed, a predetermined constant equal to the on-time of motor 19 required to take up the backlash of gearing 21 is read from memory and added to the computed product.

After operation 58 has been completed, operation 59 is performed. During operation 59 the previous correction direction is set equal to zero to indicate that motor 19 will be driven in a direction tending to close valve 11 the next time it is activated, which will be in response to the computed on-time during operation 58.

After completion of operation 59, the program advances to operation 53 the number of second between bumps counter is reset to its initial state of one. Thereby, during the next one-second operating cycle time a no response is derived during operation 41 and operation 44 is reached. During operation 44, the on-time computed during operation 58 and the polarity sign set during operation 59 are readout by computer 27 to decoder 26 so that motor 19 is driven in a direction tending to close valve 11 by an amount equal to the backlash of gearing 21 plus the amount of movement of valve stem 17 that was detected the last time motor 19 was bumped.

The computer operation continues as described supra until the backlash compensation subroutine has been entered a sufficient number of times to enable a yes output to be derived during operation 41. In response to a yes output of operation 41, the computer is sequenced through operation 45 to operation 54. During operation 54, the reset backlash sequence flag setting of zero is read, as a result of operation 57 during the preceding computer program cycle when a yes output was derived during operation 41. The backlash sequence flag being set to zero indicates that valve 11 did appear to move in response to the last bump applied thereto. Thereby, a yes output is derived from operation 54 and the program proceeds to operation 61.

During operation 61 the backlash entry flag is reset to zero so that during succeeding program cycles the backlash compensation program is not entered. Upon completion of operation 61 the main or calling program is reentered and the backlash compensating program is not again entered until the flag therefor is set in response to activation of button 3 to the automatic condition.

In another form (not illustrated), the present invention can be arranged to compensate for the measured movement of the actuator valve stem 17, with the stem 17 at its initial or bumped position, for an automatic control action in the same direction, by subtracting from the magnitude of the desired automatic control action the amount of the measured, initial movement of stem 17. An automatic control action in the other direction, when stem 17 is at the bumped position is accomplished by adding to it the sum of the predetermined magnitude (equal to the backlash of the drive mechanism comprising motor 19 and gearing 21) and the measured initial movement of stem 17. Alternatively stem 17 can be moved immediately a distance equal to the sum of the measured magnitude of the initial movement or bump and the predetermined backlash in the opposite direction and then returned to a position in the bump direction for a distance equal to the backlash in that direction.

The advantage of the form of the invention described in FIG. 2 is that the automatic control action in the opposite direction from the initial movement of stem 17 occurs sooner, and the process change due to the initial movement is eliminated promptly, restoring the original setting. The first alternative form mentioned above gives a more rapid control action in the direction of initial movement. The selection of the preferred form depends on the process and the control strategy. In each form the actuating mechanism backlash is compensated for, irrespective of its position when the control is switched from manual to automatic and the effect of the bump or initial movement of the actuator is compensated, to obtain more precise process control.

While there has been described and illustrated one specific embodiment of the invention, it will be clear that variations in the details of the embodiment specifically illustrated and described may be made without departing from the true spirit and scope of the invention as defined in the appended claims.

We claim:

1. A system for compensating for the backlash known between backlash limits of a drive mechanism for an actuator comprising a position transducer for the actuator, means for energizing the drive mechanism in a first direction, a certain amount of the energization of the drive mechanism not being necessarily coupled to the actuator because of the backlash, means for terminating energization of the drive mechanism in the first direction in response to a change in the actuator position being sensed by the position transducer, means responsive to the position transducer for deriving an indication of the amount of movement of the actuator in response to the drive mechanism being energized, and means responsive to a change in the actuator position being sensed for energizing the drive mechanism in a direction opposite to the first direction through a distance equal to the sum of the indicated amount of actuator movement and a predetermined magnitude equal to the drive mechanism known backlash.

2. The system of claim 1 wherein the energizing means includes means for stepwise energizing the drive mechanism so that the drive mechanism moves in discrete steps, and means for detecting a change in the position of the actuator after each of the discrete steps of the drive mechanism.

3. A method of changing the operation of a drive mechanism for an actuator from manual to automatic control in response to a command signal, said mechanism having a known backlash between backlash limits, the extent of the backlash between the mechanism and actuator being intermediate when the change is made, comprising the steps of energizing the drive mechanism in a first direction in response to the command signal, some of the energization of the drive mechanism not being necessarily coupled to the actuator because of the backlash, terminating energization of the drive mechanism in response to movement of the actuator being detected, measuring the amount of movement of the actuator in response to energization of the drive mechanism, energizing the drive mechanism in a direction opposite to the first direction through a distance equal to the sum of the measured amount of actuator movement and a predetermined magnitude equal to the drive mechanism known backlash, and thereafter commencing automatic control of the drive mechanism.

4. The method of claim 3 wherein the drive mechanism is stepwise energized so that it moves in discrete steps, and detecting a change in the position of the actuator after each of the discrete steps of the drive mechanism.

5. The method of claim 3 further including the steps of terminating energization of the drive mechanism a predetermined time after initiating energization thereof even though movement of the actuator has not been sensed, and initiating automatic control of the drive mechanism in response to the predetermined time having elapsed.

6. A system for compensating for the known backlash between backlash limits of a drive mechanism for an actuator comprising a position transducer for the actuator, means for energizing the drive mechanism in a first direction, a certain amount of the energization of the drive mechanism not being necessarily coupled to the actuator because of the backlash, means for terminating energization of the drive mechanism in the first direction in response to a change in the actuator position being sensed by the position transducer, means responsive to the position transducer for deriving an indication of the amount of movement of the actuator in response to the drive mechanism being energized, and means responsive to said movement indication amount to compensate an automatic control for the indicated amount of actuator movement and a predetermined magnitude equal to the drive mechanism known backlash, if backlash compensation is required.

7. The system of claim 6 wherein the energizing means includes means for stepwise energizing the drive mechanism so that the drive mechanism moves in discrete steps, and means for detecting a change in the position of the actuator after each of the discrete steps of the drive mechanism.

8. A method of changing the operation of a drive mechanism for an actuator from manual to automatic control in response to a command signal, said mechanism having a known backlash between backlash limits, the extent of the backlash between the mechansim and actuator being indeterminate when the change is made, comprising the steps of energizing the drive mechanism in a first direction in response to the command signal, some of the energization of the drive mechanism not being necessarily coupled to the actuator because of backlash, terminating energization of the drive mechanism in response to movement of the actuator being detected, measuring the amount of initial movement of the actuator in response to energization of the drive mechanism, compensating for the measured magnitude of the initial movement of said actuator and a predetermined magnitude equal to the drive mechanism known backlash, if backlash compensation is required for automatic control of the drive mechanism.

9. The method of claim 8 further including the steps of terminating energization of the drive mechanism a predetermined time after initiating energization thereof even though movement of the actuator has not been sensed, and initiating automatic control of the drive mechanism in response to the predetermined time having elapsed.

10. A method of changing the operation of a drive mechanism for an actuator from manual to automatic control in response to a command signal, said mechanism having a known backlash between backlash limits, the extent of the backlash between the mechanism and actuator being indeterminate when the change is made, comprising the steps of energizing the drive mechanism in a first direction in response to the command signal, some of the energization of the drive mechanism not being necessarily coupled to the actuator because of the backlash, terminating energization of the drive mechanism in response to movement of the actuating being detected, energizing the drive mechanism in a direction opposite to the first direction through a distance determined by the drive mechanism known backlash, and thereafter commencing automatic control of the drive mechanism.

11. A method of changing the operation of a drive mechanism for an actuator from manual to automatic control in response to a command signal, said mechanism having a known backlash between backlash limits, the extent of the backlash between the mechanism and actuator being indeterminate when the change is made, comprising the steps of energizing the drive mechanism in a first direction in response to the command signal, some of the energization of the drive mechanism not being necessarily coupled to the actuator because of backlash, terminating energization of the drive mechanism in response to movement of the actuator being detected, and compensating for the known backlash, if backlash compensation is required for automatic control of the drive mechanism.

* * * * *